(12) United States Patent
Gullicksen

(10) Patent No.: US 11,269,480 B2
(45) Date of Patent: Mar. 8, 2022

(54) CONTROLLING OBJECTS USING VIRTUAL RAYS

(71) Applicant: Gullicksen Brothers, LLC, Campbell, CA (US)

(72) Inventor: Jeff Gullicksen, Mountain View, CA (US)

(73) Assignee: Reavire, Inc., Mountain View, CA (US)

( * ) Notice: Subject to any disclaimer, the term of this patent is extended or adjusted under 35 U.S.C. 154(b) by 46 days.

(21) Appl. No.: 15/655,489

(22) Filed: Jul. 20, 2017

(65) Prior Publication Data

US 2018/0059901 A1 Mar. 1, 2018

Related U.S. Application Data

(60) Provisional application No. 62/491,048, filed on Apr. 27, 2017, provisional application No. 62/397,226, (Continued)

(51) Int. Cl.
*G06F 3/0481* (2013.01)
*G06F 3/01* (2006.01)
(Continued)

(52) U.S. Cl.
CPC .......... *G06F 3/04815* (2013.01); *G06F 3/011* (2013.01); *G06F 3/017* (2013.01);
(Continued)

(58) Field of Classification Search
CPC ...... G06F 3/04815; G06F 3/011; G06F 3/017; G06F 3/0346; G06F 3/0383;
(Continued)

(56) References Cited

U.S. PATENT DOCUMENTS

| 5,917,449 A * | 6/1999 | Sanderford | G01S 1/022 342/457 |
| 6,249,680 B1 * | 6/2001 | Wax | G01C 21/26 370/335 |

(Continued)

FOREIGN PATENT DOCUMENTS

| JP | 2001-258082 | 9/2001 |
| JP | 2013-532338 | 8/2013 |

(Continued)

OTHER PUBLICATIONS

A.D. Young, M.J. Ling, & D.K. Arvind. "Orient-2: A Realtime Wireless Posture Tracking System Using Local Orientation Estimation." Jun. 2007. EmNets '07: Proceedings of the 4th Workshop on Embedded Networked Sensors. pp. 53-57. Retrieved from https://dl.acm.org/doi/abs/10.1145/1278972.1278986 (Year: 2007).*

(Continued)

*Primary Examiner* — Jeremy L Stanley
(74) *Attorney, Agent, or Firm* — BainwoodHuang

(57) ABSTRACT

A technique for controlling objects includes a handheld controller that provides output for generating a virtual ray. The virtual ray has a location and a direction. The location of the virtual ray is measured as a location of the handheld controller, based on input from sensors in the surrounding space. As a user moves and/or rotates the handheld controller, the virtual ray sweeps through space, intersecting various objects. When the virtual ray intersects with the location of a controllable object whose identity and location are known, the handheld controller identifies the object and accepts remote-control input from the user for controlling that object. Using the handheld controller, the user may control any controllable object having a known identity and location in space, and may control virtual as well as physical objects.

28 Claims, 9 Drawing Sheets

Related U.S. Application Data filed on Sep. 20, 2016, provisional application No. 62/378,486, filed on Aug. 23, 2016, provisional application No. 62/378,498, filed on Aug. 23, 2016, provisional application No. 62/378,494, filed on Aug. 23, 2016.

(51) Int. Cl.

| | | |
|---|---|---|
| G06F 3/0346 | (2013.01) | |
| G06F 3/038 | (2013.01) | |
| G06F 3/0482 | (2013.01) | |
| G06F 3/0484 | (2013.01) | |
| G06T 17/10 | (2006.01) | |
| G06T 19/00 | (2011.01) | |
| H04L 29/06 | (2006.01) | |
| G06F 3/04815 | (2022.01) | |
| G06F 3/04845 | (2022.01) | |
| H04L 67/131 | (2022.01) | |

(52) U.S. Cl.
CPC .......... *G06F 3/0346* (2013.01); *G06F 3/0383* (2013.01); *G06F 3/0482* (2013.01); *G06F 3/04845* (2013.01); *G06T 17/10* (2013.01); *G06T 19/003* (2013.01); *G06F 2203/0384* (2013.01); *G06T 19/006* (2013.01); *H04L 67/38* (2013.01)

(58) Field of Classification Search
CPC ............... G06F 3/0482; G06F 3/04845; G06F 2203/0384; G06T 17/10; G06T 19/003; G06T 19/006; H04L 67/38
See application file for complete search history.

(56) References Cited

U.S. PATENT DOCUMENTS

| | | | | |
|---|---|---|---|---|
| 6,720,949 B1* | 4/2004 | Pryor | ............... | A63F 13/02 345/158 |
| 7,646,394 B1* | 1/2010 | Neely, III | ............... | G06F 3/011 345/419 |
| 8,312,392 B2* | 11/2012 | Forutanpour | ............ | H04W 4/21 715/863 |
| 8,456,419 B2* | 6/2013 | Wilson | ................. | G06F 3/0346 345/158 |
| 9,335,862 B1* | 5/2016 | Kritt | .................... | G06F 3/0416 |
| 9,519,344 B1* | 12/2016 | Hill | .......................... | G06F 3/01 |
| 9,571,625 B2* | 2/2017 | Kim | .................... | H04M 1/7253 |
| 2003/0235172 A1* | 12/2003 | Wood | ................. | G01S 5/0284 370/338 |
| 2004/0080412 A1* | 4/2004 | Smith | ................ | G08B 13/2462 340/539.13 |
| 2004/0193413 A1* | 9/2004 | Wilson | ................ | G06F 3/017 704/243 |
| 2005/0130677 A1* | 6/2005 | Meunier | ................ | G01S 5/021 455/456.6 |
| 2006/0007142 A1* | 1/2006 | Wilson | ................. | G06F 3/0346 345/158 |
| 2006/0022815 A1* | 2/2006 | Fischer | ................ | G06K 7/0008 340/505 |
| 2006/0022833 A1* | 2/2006 | Ferguson | ........... | A63B 24/0003 340/573.1 |
| 2006/0143292 A1* | 6/2006 | Taubenheim | ........... | H04L 63/10 709/225 |
| 2007/0268517 A1* | 11/2007 | Koarai | ................. | G06F 3/1204 358/1.15 |
| 2008/0052750 A1* | 2/2008 | Grunnet-Jepsen | ......................... | H04N 7/17318 725/109 |
| 2008/0094398 A1* | 4/2008 | Ng | ........................ | G06F 3/0486 345/427 |
| 2008/0152263 A1* | 6/2008 | Harrison | ............... | G06F 1/1626 382/313 |
| 2009/0244015 A1* | 10/2009 | Sengupta | ................ | H04W 4/21 345/173 |
| 2010/0083189 A1* | 4/2010 | Arlein | .................... | G06F 3/017 715/863 |
| 2010/0113153 A1* | 5/2010 | Yen | ......................... | A63F 13/06 463/37 |
| 2010/0293607 A1* | 11/2010 | Hall | ........................ | G06F 21/31 726/8 |
| 2011/0001686 A1* | 1/2011 | Belvin | .................. | G06F 3/1454 345/2.2 |
| 2011/0124410 A1* | 5/2011 | Mao | .......................... | A63F 13/212 463/31 |
| 2011/0154014 A1* | 6/2011 | Thorn | .................. | H04M 1/7253 713/150 |
| 2011/0312311 A1* | 12/2011 | Abifaker | ................. | H04W 4/21 455/418 |
| 2011/0320963 A1* | 12/2011 | Wong | ............... | H04N 21/43615 715/755 |
| 2012/0019674 A1 | 1/2012 | Ohnishi et al. | | |
| 2012/0127164 A1* | 5/2012 | Rhee | ...................... | G06T 17/00 345/419 |
| 2012/0289338 A1* | 11/2012 | Chen | ..................... | A63F 13/235 463/39 |
| 2013/0044612 A1* | 2/2013 | Hirsch | .................. | H04W 84/12 370/252 |
| 2013/0172007 A1* | 7/2013 | Wax | ...................... | H04W 64/00 455/456.1 |
| 2013/0231186 A1* | 9/2013 | Yoshizawa | ........... | A61B 5/6826 463/36 |
| 2013/0244684 A1* | 9/2013 | Kadous | .................. | H04W 4/02 455/456.1 |
| 2013/0328762 A1* | 12/2013 | McCulloch | .......... | G02B 27/017 345/156 |
| 2014/0125577 A1* | 5/2014 | Hoang | .................... | G06F 3/017 345/156 |
| 2014/0171107 A1* | 6/2014 | Kao | ...................... | G01C 21/206 455/456.1 |
| 2014/0171109 A1* | 6/2014 | Segev | .................... | G01S 5/0045 455/456.1 |
| 2014/0295878 A1* | 10/2014 | Yang | .................... | G01S 5/0252 455/456.1 |
| 2014/0327579 A1* | 11/2014 | Hart | .................... | H04W 64/006 342/374 |
| 2014/0349637 A1* | 11/2014 | Hyde | .................... | H01Q 1/241 455/419 |
| 2015/0031345 A1* | 1/2015 | Hyde | .................... | H01Q 1/241 455/418 |
| 2015/0121465 A1* | 4/2015 | Berns | .................... | H04W 12/08 726/4 |
| 2015/0201443 A1* | 7/2015 | Emani | ................. | H04B 10/1143 370/338 |
| 2015/0326705 A1* | 11/2015 | Garnham | ............... | G06F 3/0488 715/748 |
| 2015/0371521 A1* | 12/2015 | Braiman | ............... | G08B 21/0446 340/10.1 |
| 2016/0026253 A1* | 1/2016 | Bradski | ................. | G02B 27/225 345/8 |
| 2016/0071409 A1* | 3/2016 | Suomela | ................. | H04W 4/80 340/12.5 |
| 2016/0116995 A1* | 4/2016 | Wilson | ................... | G06F 3/017 345/157 |
| 2016/0127372 A1* | 5/2016 | Unterschuetz | ........ | H04L 63/105 726/4 |
| 2016/0205352 A1* | 7/2016 | Lee | ......................... | H04N 7/157 348/14.16 |
| 2016/0234659 A1* | 8/2016 | Luo | ......................... | H04W 4/026 |
| 2017/0171723 A1* | 6/2017 | Adachi | ................. | H04L 5/0055 |
| 2017/0287225 A1* | 10/2017 | Powderly | ............. | G06T 19/006 |

(56) References Cited

U.S. PATENT DOCUMENTS

2017/0329419 A1* 11/2017 Dearman .............. G06F 3/0346
2019/0219397 A1* 7/2019 Liu ....................... H04W 4/023

FOREIGN PATENT DOCUMENTS

| WO | 03075125 A2 | 9/2003 |
|---|---|---|
| WO | 2011065028 | 3/2011 |
| WO | 028908 A1 | 2/2013 |
| WO | 2015118135 | 8/2015 |

OTHER PUBLICATIONS

Base Station Definition. TechTerms.com. https://techterms.com/definition/basestation. Accessed on Feb. 27, 2021. (Year: 2021).*
International Application No. PCT/US2017/047154 International Search Report and Written Opinion including PCT/ISA/220, PCT/ISA/210, and PCT/ISA/237 to Gullicksen Brothers, LLC, dated Nov. 6, 2017, 15 pages.
Shop Nintendo, Nintendo Online Store web pages downloaded from https://store.nintendo.com/ng3/browse/productDetailColorSizePicker.jsp?productId=prod300018.
"Fibaro UK Permissions & Access control"; Feb. 2, 2016; 4 pages.
Li Bing et al.: CSI-Based WiFi-Inertial State Estimation; 2016 IEEE International Conference on Multisensor Fusion and Integration for Intelligent Systems (MFI), IEEE, Sep. 19, 2016, pp. 245-250.
"(Discontinued) Logitech Spotlight Presentation Remote—Advanced Digital Highlighting with Bluetooth, Universal Compatibility, 30M Range and Quick Charging-Slate"; Downloaded Apr. 22, 2020 from https://www.amazon.com/Logitech-Spotlight-Presentation-Remote-Compatibility/dp/B01N9X3DBQ.
"Mira's Prism is a $99 headset vying to become the Google Daydream of augmented reality"; Brian Heater; Jul. 18, 2017; downloaded Apr. 22, 2020 from https://techcrunch.com/2017/07/18/miras-prism-is-a-99-headset-vying-to-become-the-google-daydream-of-augmented-reality/.
"Home Center 2 Fibaro System"; archived Dec. 5, 2013 and downloaded Apr. 22, 2020 from https://web.archive.org/web/20131205091003/http://www.fibaro.com/en/the-fibaro-system/home-center-2.
Machine translation of WO2011065028.
Machine translation of JP2013532338.
Machine translation of JP2001-258082.

* cited by examiner

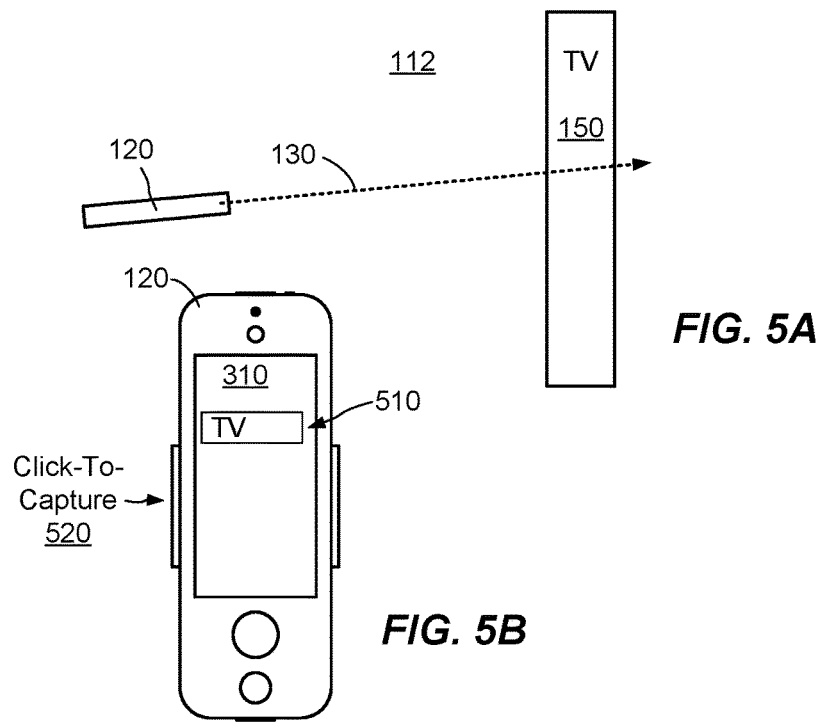
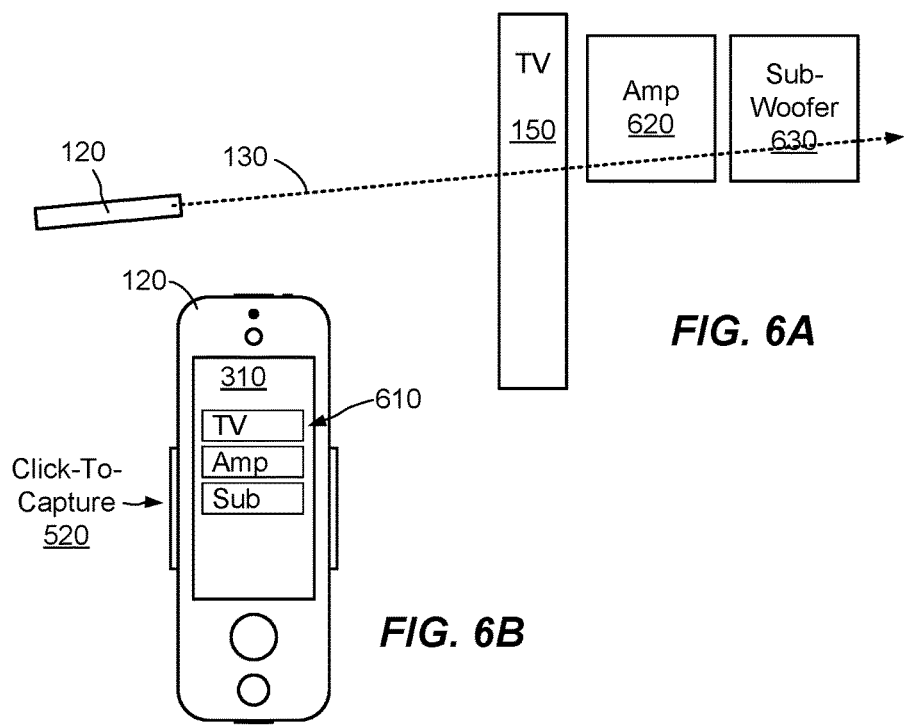

CONTROLLING OBJECTS USING VIRTUAL RAYS

CROSS-REFERENCE TO RELATED APPLICATIONS

Priority is claimed to the following previously-filed provisional patent applications:

U.S. Provisional Application No. 62/378,486, filed Aug. 23, 2016 and entitled "SECURE HUB FOR DISPATCH OF RIGHTS AND VERIFICATION OF IDENTITY, USING A UNIFORM AUTHENTICATION METHOD WITH MULTI-FACTOR VARIABLE AUTHENTICATION STRENGTH;"

U.S. Provisional Application No. 62/378,494, filed Aug. 23, 2016 and entitled "VIRTUAL SENSITIVE COMPARTMENTED INFORMATION FACILITY;"

U.S. Provisional Application No. 62/378,498, filed Aug. 23, 2016 and entitled "UNIVERSAL CONTROLLER FOR REAL AND VIRTUAL OBJECTS IN THREE DIMENSIONAL SPACE;"

U.S. Provisional Application No. 62/397,226, filed Sep. 20, 2016 and entitled "SYSTEM FOR AUGMENTED REALITY REFERENCED TO A COMMON COORDINATE SYSTEM IN REAL THREE-DIMENSIONAL SPACE, INCLUDING METHOD FOR CONTROL AND MOVEMENT OF VIRTUAL OBJECTS BETWEEN SEPARATE PHYSICAL SPACES;" and U.S. Provisional Application No. 62/491,048, filed Apr. 27, 2017 and entitled "COEXTENSIVE REALITY SYSTEM."

The contents and teachings of each of the provisional patent applications listed above are incorporated herein by reference in their entirety.

BACKGROUND

Remote controls form an essential part of many consumer electronic devices and appliances. An infrared (IR) remote control is standard equipment with almost every television set, Blue-ray disk player, audio system, or other electronic entertainment product. To use an IR remote control, a user points the remote control at a device and presses buttons. The remote control converts the user's button presses into IR signals, which travel through the air and impinge upon an IR detector in the device. The device converts the detected IR signals to corresponding commands, which the device carries out to effect the desired changes in state or settings.

Some consumer devices use radiofrequency (RF) remote controls. An RF remote control converts user button presses into RF communication signals, which travel through the air and impinge upon an antenna within an RF-enabled device. Circuitry within the device decodes the RF signals, translates them into commands, and implements the commands to effect the desired changes.

Various universal remote controls are also known in the art. Users can program a universal remote control by entering a code, which identifies a make and model of the device to be controlled. The universal remote control retrieves commands for the entered make and model of device (e.g., from an on-board database) and proceeds to implement the control commands when users press buttons. Both IR and RF universal remote controls are known, with some universal remote controls combining IR and RF technologies.

Other known solutions for remote control include smart home software portals and voice-activated systems. Also, apps can be downloaded to conventional smart phones, which enable the smartphones to act as remote controls.

SUMMARY

Unfortunately, remote controls tend to proliferate, with the typical household including many remote controls, which can be difficult to manage on account of their sheer number. Some remote controls are seldom used. Others are often misplaced. Universal remote controls can help to reduce the number of remote controls within a household, but they can be difficult for some to program and use.

In contrast with prior solutions for remote control, an improved technique for controlling objects includes a handheld controller that provides output for generating a virtual ray. The virtual ray has a location and a direction. The location of the virtual ray is measured as a location of the handheld controller, based on input from sensors in the surrounding space. As a user moves and/or rotates the handheld controller, the virtual ray sweeps through space, intersecting various objects. When the virtual ray intersects with the location of a controllable object whose identity and location are known, the handheld controller identifies the object and accepts remote-control input from the user for controlling that object. Using the handheld controller, the user may control any controllable object having a known identity and location in space.

Advantageously, a single handheld controller can replace many individual remote controls, providing a single control paradigm for a wide range of devices and appliances. The control paradigm enables many conveniences and advantages and is extendable to virtual objects as well as to physical ones.

In some examples, measuring the location of the handheld controller involves transmitting a wireless signal from the handheld controller. The wireless signal propagates through space and encounters multiple antennas, which process the wireless signal to produce respective outputs. The outputs are processed to yield the location of the handheld controller.

In some examples, the handheld controller includes a click-to-capture feature, whereby a user can click a button to capture the identities of any objects that the virtual ray currently intersects within the space. With the identities captured, the user is free to reorient the handheld controller to any comfortable angle and to select and control any of the captured objects, even though the handheld controller may no longer point to any of the captured objects.

In some examples, the handheld controller stores a history of objects previously controlled. A user can select a controllable object from the history and transmit control instructions to that object, without needing to point the handheld controller at the object or even to be in the same room.

In some examples, a control location of a controllable object is established as a user-defined region in 3-D space. The control location may intersect with part or all of the object, or it may be offset from the object in a user-defined way.

A user may establish the user-defined location of the controllable object via a training procedure. In some examples, the training procedure may involve pointing the handheld controller at a desired control location of the object from multiple training locations in the space and identifying the desired control location as a region of intersection of virtual rays extending from the training locations. In other examples, the training procedure involves touching the handheld controller to the desired control location, to establish the control location as a current location of the handheld controller. In some examples, training may involve defining an extent in two or three-dimensional space, e.g., by training on vertices of an object, such that the entire extent becomes the control location. In other examples, training may involve identifying multiple distinct regions, with any of the distinct regions providing a control location for the object.

In some examples, the controllable object is a virtual object. For example, the handheld controller may operate in communication with a 3-D headset, which shows virtual objects as holograms at known locations in the surrounding space. When using a 3-D headset, a user may operate the handheld controller to select and manipulate holograms visible through the 3-D headset. In some examples, a handheld controller operating in communication with the 3-D headset provides a holographic pointing device, which a user may operate to select and manipulate holograms visible through the 3-D headset.

Certain embodiments are directed to a method of controlling objects in a 3-D (three-dimensional) space using a handheld controller. The method includes storing an object database that associates multiple controllable objects with respective control locations of the controllable objects in the 3-D space. Each control location represents a respective region in the 3-D space to which the handheld controller can be pointed to control the respective controllable object. The method further includes measuring a location of the handheld controller in the 3-D space, and measuring an orientation of the hand-held controller in the 3-D space. The method further includes combining the measured location of the handheld controller with the measured orientation of the handheld controller to construct a virtual ray, the virtual ray having an origin placed at the measured location of the handheld controller and a direction based on the measured orientation of the hand-held controller. In response to the handheld controller pointing such that the virtual ray intersects a control location of a controllable object in the object database, the method still further includes (i) accepting user input by the handheld controller for controlling the controllable object, and (ii) transmitting control instructions from the handheld controller for controlling the controllable object based on the user input.

Other embodiments are directed to a handheld controller for controlling objects. The handheld controller includes a user interface, a wireless communication interface, and measurement circuitry configured to measure an orientation of the handheld controller in 3-D (three-dimensional) space. The handheld controller further includes a set of processors and memory. The set of processors and the memory together form control circuitry constructed and arranged to direct the measurement circuitry to produce measurements of orientation of the handheld controller and to direct the wireless interface to send wireless signals, including signals that carry the measurements of the orientation of the handheld controller, to multiple sensors (i) to enable locations of the handheld controller to be measured based on the wireless signals as received by the multiple sensors and (ii) to generate virtual rays, each virtual ray having an origin at a respective measured location of the handheld controller and a direction based on a respective measured orientation of the handheld controller. The control circuitry is further constructed and arranged to identify a controllable object intersected by one of the virtual rays and to direct the wireless interface to transmit control instructions for controlling the identified controllable object.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

FIGS. 5A and 5B are views of the handheld controller of FIGS. 3 and 4 depicting use of the handheld controller for selecting a television.

FIGS. 6A and 6B are views of the handheld controller of FIGS. 3 and 4 depicting use of the handheld controller for selecting one of multiple objects.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for controlling objects includes a handheld controller that communicates with a separate server to generate a virtual ray. When the virtual ray intersects with the location of a controllable object whose identity and location are known, the handheld controller identifies the object and accepts remote-control input from the user for controlling that object. Using the handheld controller, the user may control any controllable object having a known identity and location in space. In some examples, the controllable object is a virtual object, and the handheld controller acts as a holographic pointer device.

Figure 1:
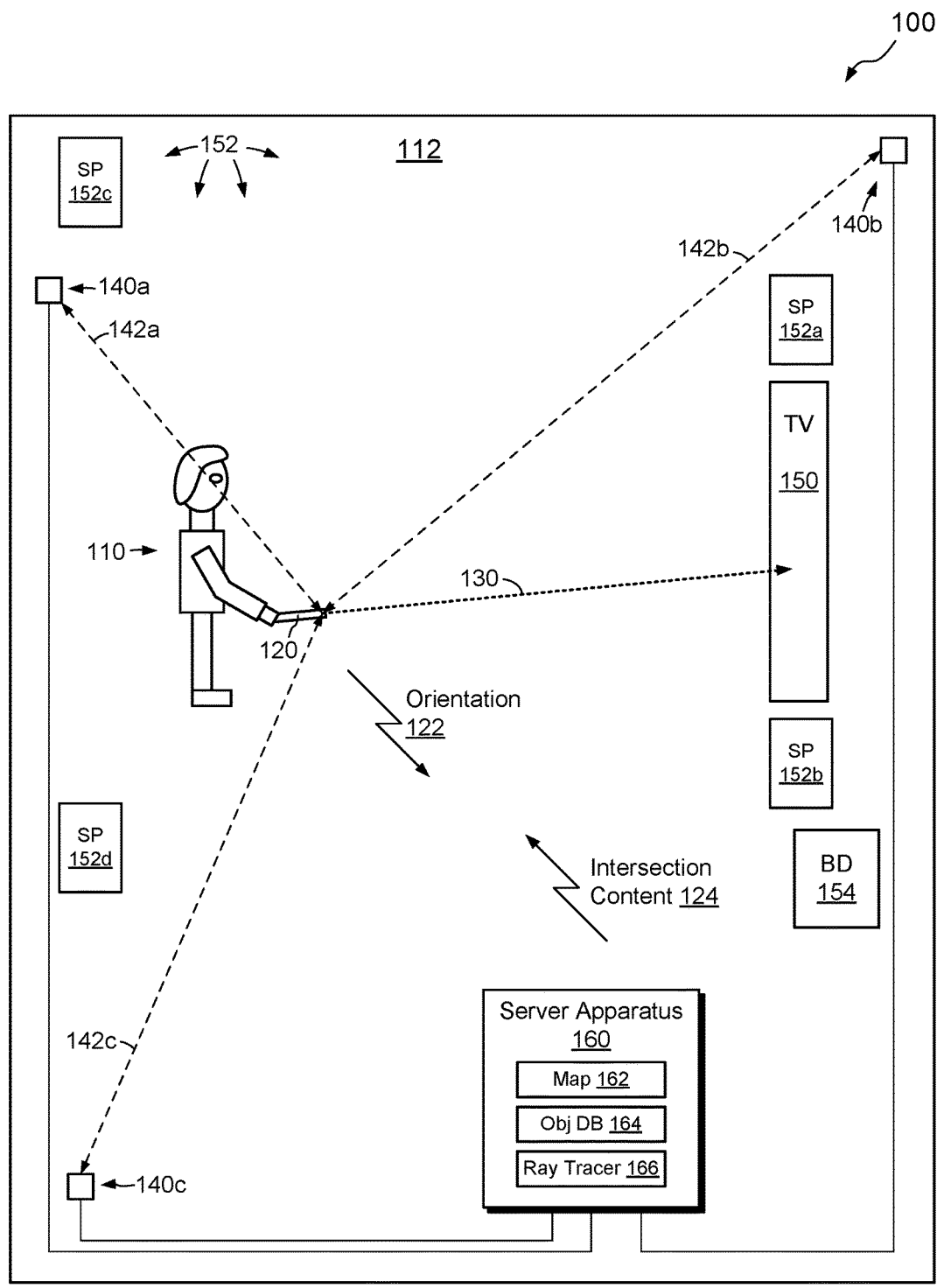
FIG. 1 is a top, plan view of an example environment in which embodiments of the improved technique can be practiced.

FIG. 1 shows an example environment 100 in which embodiments of the improved technique hereof can be practiced. Here, a user 110 is located in a 3-D (three-dimensional) physical space 112 and operates a handheld controller 120 for controlling objects in the physical space 112. Such objects may include, for example, a television set 150, speakers 152 (e.g., 152a-152d), and a Blue-ray disk player 154. The handheld controller 120 includes measurement circuitry for measuring its own orientation in the 3-D space 112. The handheld controller 120 also includes a wireless interface for communicating with the server apparatus 160 using wireless signals, such as Wi-Fi (IEEE 802.11) and/or Bluetooth signals.

Sensors 140 (e.g., 140a-140c) placed at respective locations in the physical space 112 detect the presence of the handheld controller 120 and provide detection information as outputs. The outputs from the sensors 140 are coupled, using wired or wireless connections, to the server apparatus 160, which is configured to process the outputs and to measure therefrom 3-D locations of the handheld controller 120 in the physical space 112.

As shown, the server apparatus 160 includes map data 162, an object database 164, and a ray tracer 166. The map data 162 describes physical features of the physical space 112, such as locations, sizes, and orientations of walls, floors, ceilings, furniture, stairways, doors, windows, and the like. The map data 162 may express locations of these features in accordance with any suitable 3-D coordinate system. The object database 164 stores information about controllable objects in the physical space 112, such as the television set 150, speakers 152, and Blue-ray disk player 154. Such information may include, for example, a unique identifier for each controllable object, an alias (nick name) of that controllable object, a library of user interface screens for controlling the object with the handheld controller 120, a set of control instructions and corresponding codes for changing the state and/or settings of the object, and any other desired or relevant information. The object database 164 may also store a control location in connection with each object, which may be expressed in accordance with the same 3-D coordinate system as described above. As used herein, a "control location" is a physical extent in the 3-D space 112 defined for a controllable object and to which the handheld controller 120 may be pointed to control the controllable object.

In example operation, the user 110 points the handheld controller 120 somewhere in the physical space 112. As the user 110 moves and rotates the handheld controller 120, the measurement circuitry in the handheld controller 120 generates new orientation measurements 122 and sends the new measurements to the server apparatus 160, e.g., via wireless signals. At the same time, the sensors 140 detect the presence of the handheld controller 120 (e.g., via paths 142a-142c), generate outputs, and send their outputs to the server apparatus 160. The server apparatus 160 receives the outputs from the sensors 140 and generates updated measurements of the location of the handheld controller 120 in the 3-D space 112. The ray tracer 166 in the server apparatus 160 then generates virtual rays, by combining received measurements of orientation from the handheld controller 120 with corresponding measurements of location. Each virtual ray 130 has an "origin," which may be the measured location of the handheld controller 120, and a corresponding "direction," which is based on the orientation of the handheld controller 120 as measured at the same time. In some examples, the server 160 may adjust output from the measurement circuitry by a known angle, such that the direction of the virtual ray 130 always extends parallel to the handheld controller 120, analogously to the way that an IR beam might extend from the end of a conventional IR remote. One should appreciate, however, that virtual rays are not physical in nature but are rather geometrical entities referenced to the 3-D space 112. For example, the origin of each virtual ray 130 is a point in the 3-D space having a set of coordinates. The direction of each virtual ray 130 is an angle formed with respect to that set of coordinates in the 3-D coordinate system.

As the user 120 moves and rotates the handheld controller 120, the virtual ray 130 sweeps through the physical space 112 and intersects with locations of various objects. When the virtual ray 130 intersects the control location of a controllable object listed in the object database 164, the server apparatus 160 detects the intersection and sends intersection content 124 back to the handheld controller 120, e.g., using wireless signals.

The intersection content 124 may include, for example, certain information stored in the object database 164 in connection with the intersected object, such as a unique name and/or alias. The intersection content 124 may further include a control set for controlling the intersected object, user interface screens for interacting with the intersected object, and/or other information.

The handheld controller 120 receives the intersection content 124 and alerts the user 110 about the intersected object. For example, the handheld controller 120 displays the identifier of the intersected object on a touchscreen. The user 110 may then interact with the handheld controller 120 to provide user input for controlling the intersected object. For example, the handheld controller 120 receives user input, via the touchscreen and/or physical buttons or other controls, and transmits instructions for controlling the intersected object. In some examples, the handheld controller 120 sends instructions directly to the intersected object, e.g., using Wi-Fi or Bluetooth signals. In other examples, the handheld controller 120 sends instructions to the server apparatus 160, which in turn sends instructions to the intersected object for effecting the user-specified changes in status and/or settings.

In an example, the sensors 140 are realized in the form of antennas that detect Wi-Fi (IEEE 802.11) signals that emanate from the handheld controller 120, as well as from other wireless devices in the vicinity. In response to an antenna detecting a wireless signal, such as a Wi-Fi packet, the antenna sends information about the detection to the server apparatus 160, which processes the information along with similar detection information from other antennas to locate the source of the wireless signal. An example of an approach of this kind is described in U.S. patent application Ser. No. 15/452,451, filed Mar. 7, 2017 and entitled "CONTROLLING ACCESS TO A COMPUTER NETWORK USING MEASURED DEVICE LOCATION," which is incorporated herein by reference. Using the approach disclosed in the incorporated document, the server apparatus 160 is capable of measuring the location of the handheld controller 120 to within an accuracy of single centimeters. One should appreciate that antennas can be used to locate objects using a variety of techniques, and that the invention hereof is not limited to the particular ones disclosed in the incorporated document. Also, sensors besides antennas may be used in various embodiments, such as cameras, sonic transducers, and the like.

Using the approach described in the incorporated document (and similar approaches), each Wi-Fi packet sent by the handheld controller 120 can serve as the basis for a respective location measurement, provided that the handheld controller 120 is within range of a sufficient number of antennas (generally three or more). Further, the same Wi-Fi packet that serves as a basis for measuring location may carry the orientation information 122 used for conveying the orientation of the handheld controller 120.

The location and orientation measurements used to generate the virtual ray 130 refer to the same point in time, or nearly so. One should appreciate, however, that strict simultaneity is not required, provided that any time difference between sampling orientation and emitting a packet is small enough to be negligible when considered on a human scale. Corresponding measurements of orientation and location are considered herein to be simultaneous provided they are separated in time by less than several milliseconds.

As stated, the server apparatus 160 detects a controllable object when the virtual ray 130 intersects the object's control location. The control location for a controllable object may be a two-dimensional region or a three-dimensional region. For example, the control location for the TV set 150 may be two-dimensional, as it is unlikely that the user 110 would ever want to control the TV set 150 from the side. However, the control locations for the speakers 152 may be three dimensional, as it is more likely that the user 110 would have occasion to control the speakers from multiple angles. The control location for an object generally coincides with a visible surface or volume of the object that the user 110 sees when controlling the object. This is not strictly required, however, as the user 110 may wish to offset the control location from the object being controlled. For example, the control location for a lamp (not shown) might be set to coincide with a table on which the lamp is placed. Indeed, control locations may be placed with great flexibility, with user convenience in mind, and with no necessary relationship to the physical location of the objects being controlled.

Along the same lines, the control locations of some objects may be spatially decoupled from the location of an electronic controller for those objects. For example, control locations for the speakers 152 may correspond to their physical volumes in space, even though the speakers 152 may be controlled by an amplifier located elsewhere. In an example, the user 110 may point the handheld controller 120 at any of the speakers 152 to turn the volume up or down. As this example suggests, the control location for an object may be provided in the form of multiple distinct regions, as the user 110 may control the volume of all four speakers by pointing to any one of them.

Although certain activities have been ascribed herein to the handheld controller 120 and others have been ascribed to the server apparatus 160, one should appreciate that certain activities may be performed by either, or by both. For example, the handheld controller 120 may store the map 162 and/or the object database 164, rather than the server apparatus 160. For measuring location of the handheld controller 120, the server apparatus 160 may act merely as a hub for pre-processing outputs from the sensors 140, with pre-processed results sent to the handheld controller 120, where location measurements can be made. However, improved security may be achieved by avoiding persistent storage of map or object information in the handheld controller 120.

Figure 2:
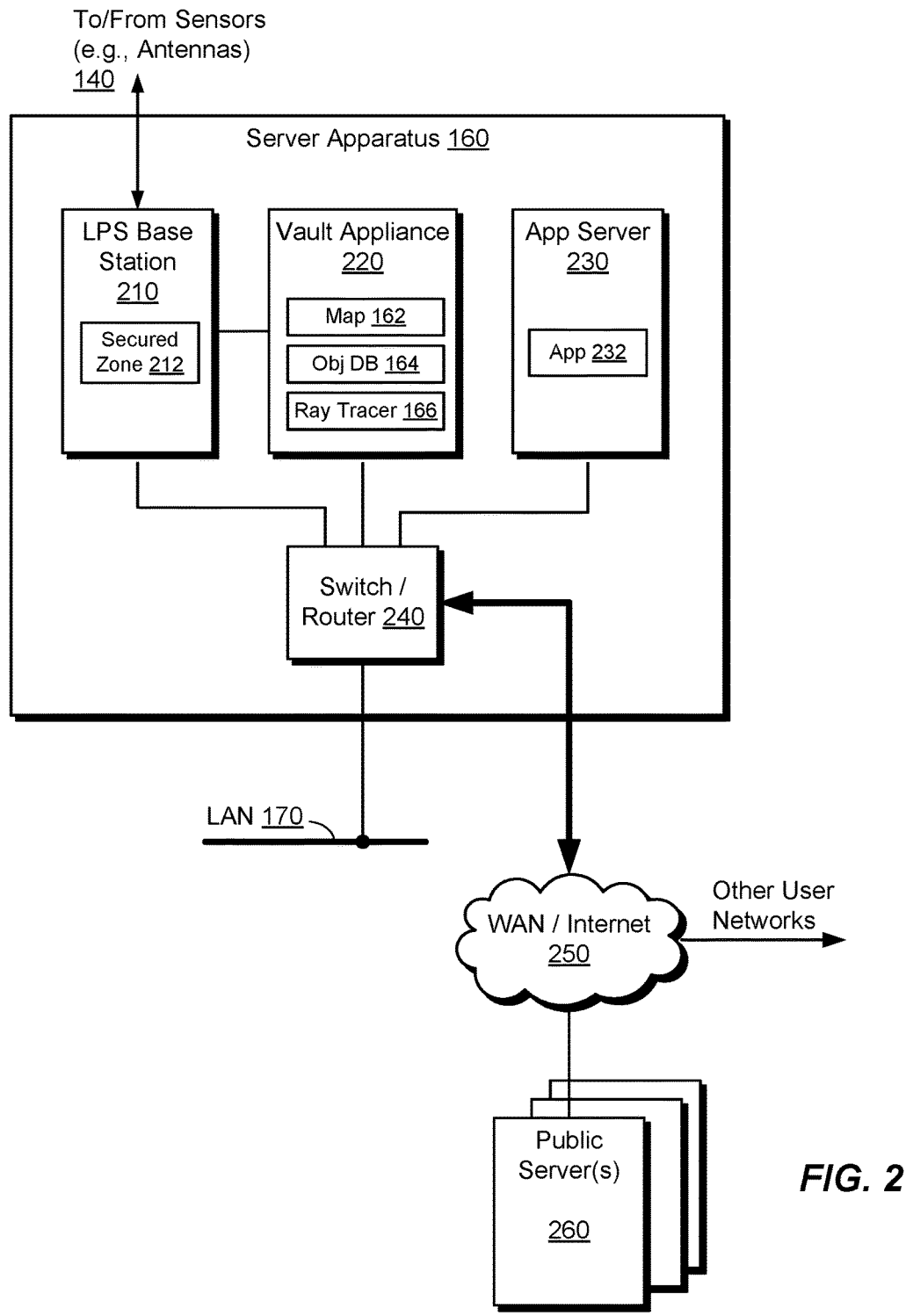
FIG. 2 is a block diagram of example electronic componentry that may be used in connection with the electronic environment of FIG. 1.

FIG. 2 shows an example of the server apparatus 160 and related components in additional detail. Here, the server apparatus 160 includes an LPS (local positioning service) base station 210, a vault appliance 220, an application server 230, and a switch/router 240. In various examples, these components may be provided separately, as a single integrated unit, or as any combination of physical units.

The LPS base station 210 receives inputs from the sensors (e.g., antennas) 140 and generates therefrom locations of the handheld controller 120, as well as locations of other Wi-Fi devices in the vicinity. In an example, the LPS base station 210 measures device locations using wireless packets (e.g., Ethernet Wi-Fi packets), which the devices emit as part of their normal communications. The LPS base station 210 maintains a 3-D map of a secured zone 212 within range of the sensors 140. The secured zone 212 defines a region relative to the physical space 112 in which Wi-Fi communications with the switch/router 240 are permitted. In an example, packets received by the LPS base station 210 are allowed to pass to the switch/router 240 only if those packets originate from a device confirmed to be located within the secured zone 212. Further details of location measurement using antennas and an LPS base station 210 may be found the above-incorporated U.S. patent application Ser. No. 15/452,451.

The vault appliance 220 is a secure hub for storing and dispatching rights. Such rights may include content rights for accessing particular content, communication rights for establishing communications with another party, and action rights for performing actions on particular devices or elements. For example, the vault appliance 220 may securely store the map data 162 and object database 164, or portions thereof, and may securely control the release of such map and object data using content rights and/or communication rights. Further details of the vault appliance 220 may be found in U.S. patent application Ser. No. 15/347,551, filed Nov. 9, 2016 and entitled "VAULT APPLIANCE FOR IDENTITY VERIFICATION AND SECURE DISPATCH OF RIGHTS," the contents and teachings of which are incorporated by reference herein.

Features of the LPS base station 210 and vault appliance 220 promote security and provide other benefits, but their particular details should be regarded as optional unless otherwise specified.

The application server 230 is a computerized device configured to run software applications, such as an application 232. The application server 230 may be implemented as a general purpose computer or as a specialized system, such as a game hub.

The switch/router 240 may have a conventional design. For example, the switch/router 240 has LAN (Local Area Network) ports for connecting to the LPS base station 210, vault appliance 220, and application server 230, as well as for distributing a wired LAN 170 throughout the physical space 112. The switch/router 240 may also have a WAN (Wide Area Network) port, for connecting to a WAN/Internet 250. In some examples, the switch/router 240 is a wired device only, with wireless services performed by the LPS base station 210, e.g., using one or more of the antennas. In other examples, the switch/router 240 directly supports both wired and wireless communications.

Using the WAN port, the switch/router 240 may connect to one or more public servers 260. These may include on-line stores (e.g., for buying software, buying games downloading control software for controllable objects, etc.)

and various servers to support vault-based communications. The switch/router 240 also supports communication over the WAN/Internet 250 with similarly-configured networks of other users, e.g., to support multi-player games or other applications across different local networks and locations.

Although not specifically shown, one should appreciate that the LPS base station 210, the vault appliance 220, and the application server 230 each include their own processing circuitry and memory. Each memory may store instructions which, when run by the respective processing circuitry, cause the processing circuitry to carry out various procedures and activities as described herein. Unless otherwise specified, one should appreciate that any activities ascribed to the server apparatus 160 may be performed by any of the included components, or by any combination of such components.

In an example, the handheld controller 120 is a vault network element, of the kind described in the incorporated U.S. patent application Ser. No. 15/347,551. Also, controllable physical objects may be vault network elements or devices, i.e., elements or devices registered with the vault appliance 220 and conforming to vault protocols. As a vault element, the handheld controller 120 operates only within the secured zone 212. For example, the server apparatus 160 may be configured to ignore any packets received from the handheld controller 120 when the location of the handheld controller 120 cannot be confirmed to be situated within the secured zone 212.

In some examples, vault protocols may allow the handheld controller 120 to be used on other vault networks. For example, the user 110 may bring the handheld controller 120 to a different vault network (in a different physical space) and may use the handheld controller 120 in the other space for limited purposes.

Figure 3:
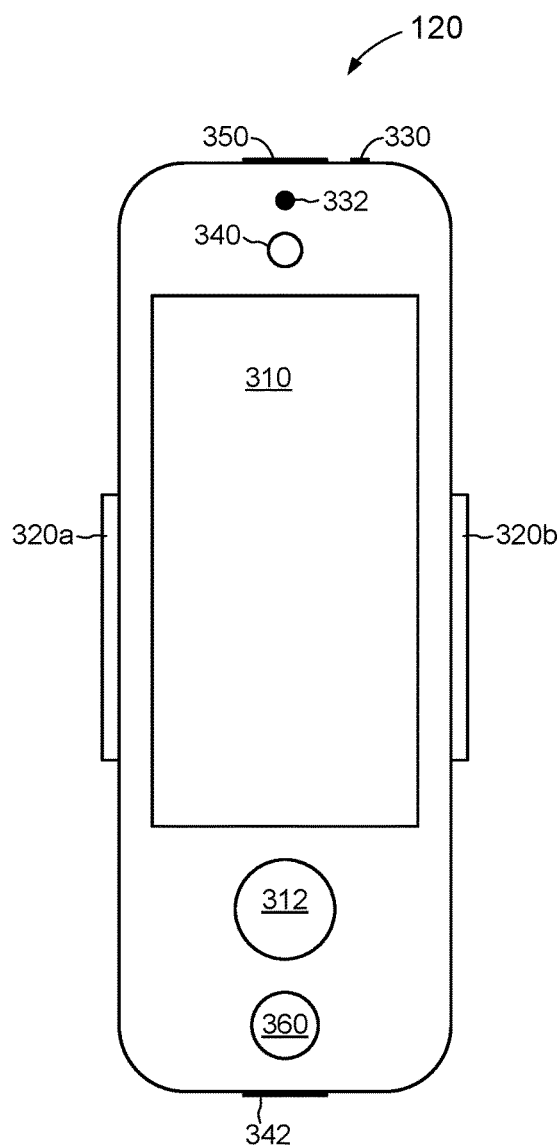
FIG. 3 is a front view of an example handheld controller.

FIG. 3 shows an example physical arrangement of a handheld controller 120. Examples of controls and interfaces of the handheld controller 120 are indicated below:
  Touch Screen 310: Programmable touch screen.
  Common Actions Dynamic Backlit Pad 312: Control for most common actions of selected object.
  Left Multifunction Button 320*a*: Selection/navigation button.
  Right Multifunction Button 320*b*: Selection/navigation button.
  Narrow Field Camera 330: Fiber optic light pipe or other narrow field camera for photo, video, mapping, or gaming.
  Selfie Camera 332: May be used for biometric authentication and identification.
  Communications Speaker 340: Speaker for phone or other audio functions.
  Microphone 342: For voice commands, voice ID (authentication/identification), phone, and/or other audio uses.
  Flush Contact Local Interface 350: Interactive video game device interface.
  Thumbprint Sensor 360: Biometric authentication and identification input.

The physical arrangement shown in FIG. 3 is intended to be illustrative. For example, the handheld controller 120 may include additional buttons, controls, and interfaces. It may alternatively include fewer buttons, controls, and interfaces, or ones different from those shown.

In some examples, the user 110 is required to authenticate to the handheld controller 120 prior to using it. Selfie camera 332, microphone 342, and thumbprint sensor 360 support various forms of biometric authentication. Also, in some examples, the handheld controller 120 may support multiple users, with each user required to authenticate to the handheld controller 120 prior to use.

Figure 4:
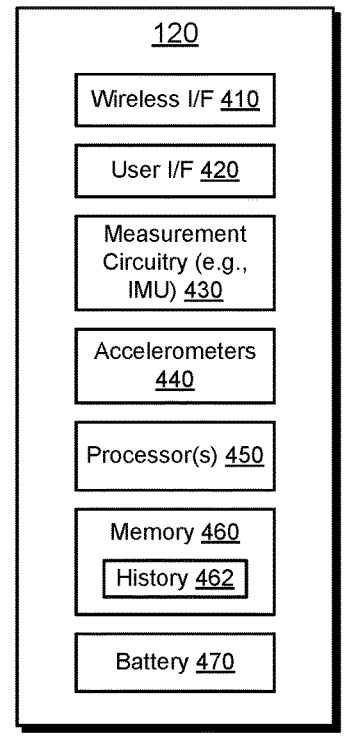
FIG. 4 is a block diagram of certain electronic features of the example handheld controller of FIG. 3.

FIG. 4 shows an example arrangement of additional components of the handheld controller 120, which may include the following:
  Wireless interface 410: Wi-Fi and/or Bluetooth interfaces.
  User interface 420: Hardware and software support for touchscreen 310 and various buttons and controls shown in FIG. 3.
  Measurement circuitry 430: Orientation measurement circuitry, such as an inertial measurement unit (IMU), for measuring orientation of the handheld controller 120.
  Accelerometer(s) 440: For measuring acceleration of the handheld controller 120. Accelerometer(s) may be provided as part of measurement circuitry 430 or separately.
  Processor 450: One or more microprocessors and/or microcontrollers, along with associated processing hardware for performing data processing.
  Memory 460: Non-volatile memory, such as one or more ROMs (read only memories) flash drives and/or magnetic disk drives, as well as volatile memory, such as RAM (random access memory).
  Battery 470: Battery for powering handheld controller 120. May be rechargeable or disposable.

The processor 450 and the memory 460 together form control circuitry, which is constructed and arranged to carry out various methods and functions as described herein. Also, the memory 460 includes a variety of software constructs realized in the form of executable instructions. When the executable instructions are run by the processor 450, the processor 450 is caused to carry out the operations of the software constructs.

In some examples, the accelerometers 440 provide a local mechanism for measuring changes in the location of the handheld controller 120. The processor 450 may receive output from the accelerometers and apply such output in varying the rate at which the wireless interface 420 transmits packets. For example, the processor 450 may direct the wireless interface 410 to increase the rate at which it sends packets in response to detecting an increase in movement of the handheld controller 120. Likewise, the processor 450 may direct the wireless interface 410 to decrease the rate at which it sends packets in response to detecting a decrease in movement of the handheld controller 120. Sending packets at a higher rate allows the server apparatus 160 to better track the location of the handheld controller 120 when it is moving quickly. Sending packets at a lower rate conserves power (battery life) when the handheld controller 120 is not moving or is moving slowly. Packets sent for purposes of triggering location measurements may have empty or nearly empty payloads. The handheld controller 120 may send such "locator packets" at any time when it is desired to obtain a fresh location measurement.

In some examples, the battery 470 is a rechargeable battery and the handheld controller 120 further includes a charging connector (not shown). According to some variants, the handheld controller 120 may be provided with a charger (not shown). The charger may serve the dual purpose of both charging the handheld controller 120 and holding it in an upright orientation. In some examples, the handheld controller 120 detects its placement into the charger and proceeds to calibrate the measurement circuitry 430 to the upright position.

In some examples, the memory 460 stores a history 462 of previous objects controlled by the handheld controller

120. The user 110 may navigate the history and select a previously-controlled object, issuing new controls instructions to the same object. The history 462 thus provides a way to control an object without having to point the handheld controller 120 toward the object, or even having to be in the same room.

FIGS. 5A and 5B show an example detection of a controllable object in the physical space 112. In FIG. 5A, the user has pointed the handheld controller 120 at the TV set 150 (FIG. 1), such that the virtual ray 130 intersects the control location of the TV set 150. As shown in FIG. 5B, the handheld controller 120 displays a screen element 510 on the touchscreen 310 that identifies the intersected element ("TV"). For example, the server apparatus 160 accesses control locations of objects in the object database 164 and detects the intersection of the virtual ray 130 with the control location of the TV set 150. The server apparatus 160 then directs the handheld controller 120 to display an identifier (an alias in this case) of the intersected component on the touchscreen 310. The user 110 may then click the screen element 510 to select the TV set 150 and proceed to operate user interface controls to establish desired settings for the TV set 150. For example, when the user enters commands, the handheld controller 120 sends encoded versions of the commands to the TV set 150, which receives the encoded commands, decodes them, and proceeds to effect the specified settings. In an example, the handheld controller 120 uses rolling encryption keys in any communications sent to the TV set 150, e.g., in accordance with vault network protocols. As the TV set 150 in this example is also a vault network device or element, it operates in compliance with vault protocols and includes the necessary keys for decrypting encoded instructions that it receives from the handheld controller 120.

In some examples, the handheld controller 120 includes a click-to-capture feature 520, which the user may invoke by pressing a button on the handheld controller 120, such as the left multifunction button 320a (as shown), or any button or control. The user 110 invokes the click-to-capture feature 520 while pointing the handheld controller 120 at the TV set 150, i.e., while the virtual ray 130 is intersecting the control location defined for the TV set 150. Once invoked, the click-to-capture feature 520 captures and holds the detection of the TV set, which allows the user 110 to stop pointing the handheld controller 120 at the TV set 150. Rather, the user 110 can orient the handheld controller 120 at any comfortable or convenient angle and proceed to enter user input for controlling the TV set 150. The click-to-capture feature 520 thus combines the specificity afforded by pointing the handheld controller 120 with the comfort of being able to control object without having to continue pointing.

FIGS. 6A and 6B show an example of multiple detections of controllable objects in the physical space 112. In FIG. 6A, the handheld controller 120 is pointed such that the virtual ray 130 intersects three different elements, the TV set 150, an amplifier 620, and a subwoofer 630. Detection proceeds as before, but this time all three objects are detected, as the virtual ray 130 intersects control locations of all three of them.

In FIG. 6B, the handheld controller 120 displays screen elements 610 on the touchscreen 310 that identify the intersected elements ("TV," "Amp," and "Sub"). The user 110 may operate the touchscreen 310 to select any of the displayed objects and to provide user input for controlling the selected object, as described above. If the user 110 invokes the click-to-capture feature 520 while pointing at all three objects, the handheld controller 120 captures and holds the detections of all three objects, such that the user can select a desired object and enter user input for establishing its settings from any comfortable angle.

In some examples, the server apparatus 160 may apply map information 162 when detecting objects intersected by the virtual ray 130. For example, the server apparatus 160 may filter out objects known to be hidden from sight from the vantage point of the handheld controller 120, such as objects behind walls, in different rooms, etc. Such filtering can help to avoid presenting the user 110 with choices that are not likely to be relevant to the user's current location. According to some variants, whether to filter an object that is not currently visible may be an attribute assigned on a per-object basis, as it may be desired to preserve the option to control certain objects that are not currently visible.

Figure 7A:
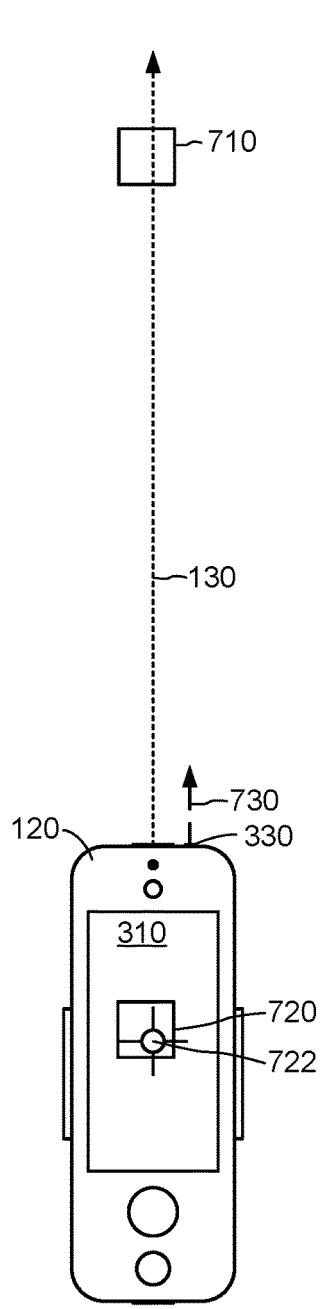
FIGS. 7A-7C show various example aspects of training a handheld controller on a particular control location.
Figure 7B:
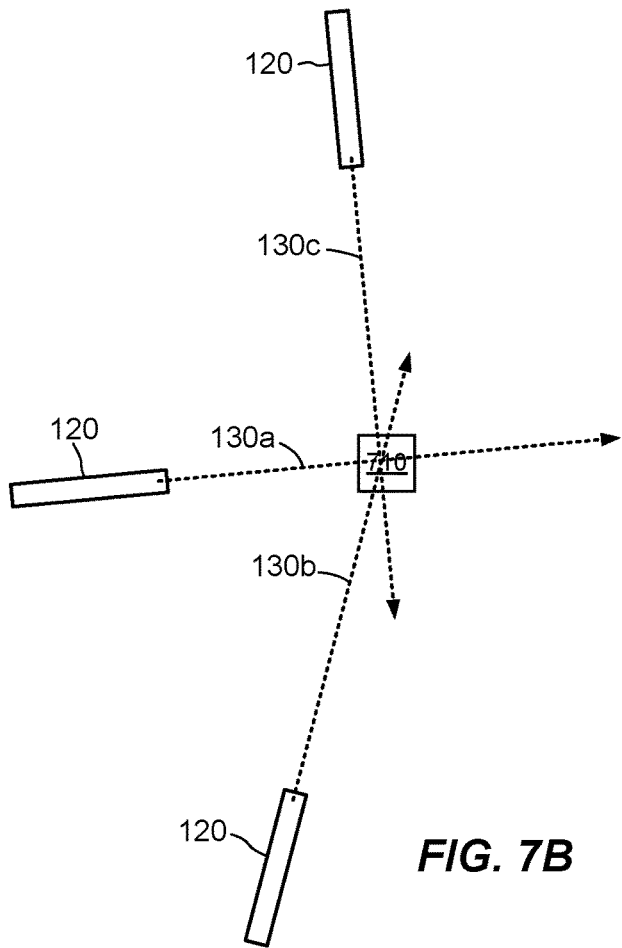
Figure 7C:
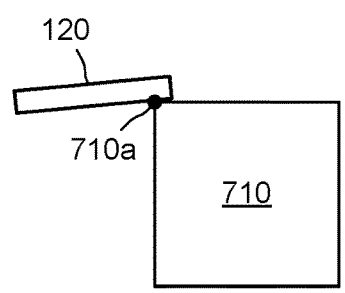

FIGS. 7A-7C show various techniques that the user 110 may employ for establishing the control location of a controllable object 710. In FIG. 7A, the user 110 places the handheld controller 120 in a training mode, e.g., by operating appropriate controls, and points the handheld controller 120 at the object 710. For this example, it is assumed that the object 710 is a controllable object registered with the vault network but having no specified control location.

In training mode, the handheld controller 120 may display images captured by the narrow field camera 330 (FIG. 3). The camera 330 is preferably mounted in the handheld controller 120 such that its optical axis 730 is aligned with the direction of the virtual ray 130. For example, the optical axis 730 and the virtual ray 130 are arranged to be parallel. In some examples, the optical axis 730 and the virtual ray 130 may be collinear. With either arrangement, the center of the field of view of the camera 330 corresponds closely to a point of intersection of the virtual ray 130 on the object being visualized. The handheld controller 120 may display crosshairs 722 to allow for accurate centering. The handheld controller 120 may interpret a particular button press in this mode as an instruction to register a current value of the virtual ray 130 (e.g., its location and direction) when pointing to the object 710.

A single vantage point is generally not sufficient to identify a control location of a controllable object. For example, the value of the virtual ray 130 in FIG. 7A merely indicates that the control location of object 710 lies somewhere along the virtual ray 130. At least one other vantage point is needed.

In FIG. 7B, the user 110 views the object 710 from different vantage points and registers three values 130a, 130b, and 130c of the virtual ray. The intersection of the virtual rays 130a, 130b, and 130c uniquely identifies the location of the object 710.

In FIG. 7B, the user merely touches the object 710, or a portion of the object 710, with the handheld controller 120. The user 110 may press a button to identify the touch, or the handheld controller 120 may detect the touch automatically, e.g., by monitoring output of the accelerometer(s) 440. The point of contact 710a may be taken as the location of the handheld controller 120 at the moment of contact. For example, the processor(s) 450 may direct the wireless interface 410 to transmit a locator packet when contact is detected, either by receiving a user button-push or by monitoring the accelerometer(s) 440.

In cases where the control location of an object is taken simply as a point in space, the server apparatus 160 may assign the "point" some default size, such as several square centimeters, so that it is possible to aim the handheld controller 120 at the control location without undue effort. In other examples, the point is not used alone but is rather one of multiple points used to define the object's control location.

Figure 8:
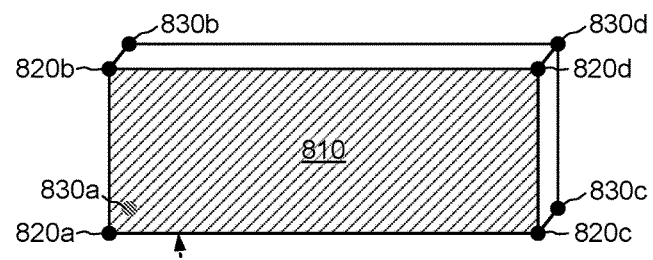
FIG. 8 shows a front view of an example arrangement for training a handheld controller on a particular extent in space.

FIG. 8 shows an example of extent training, which the user 110 may employ to identify the control location of an object 810. Here, the object 810 has the shape of a rectangular prism having eight vertices, including four front vertices 820a-820d and four back vertices 830a-830d. Using multiple vantage points and/or touch training (FIGS. 7B and/or 7C), the user 110 may train the handheld controller 120 on each of the eight vertices, or on any subset of them. The user 110 may also train on other points that are not vertices. The system (handheld controller 120 and server apparatus 160) then generates the control location of the object 810 as the smallest convex extent that includes all of the trained vertices. When using extent training, it is not necessary for trained points to have any finite size, as trained points are used together to form shapes.

One should appreciate that the control location of the object 810 may be two-dimensional or it may be three dimensional. For example, if the object 810 is a flat-screen TV placed on a wall, there may be little benefit to training its location as a 3-D extent, as the user 110 may always be in front of the object when controlling it. In such cases a 2-D planar region may be sufficient (such as shown using hatching). Alternatively, if the object 810 is a faux fireplace located in the center of a room, training the object 810 as a 3-D extent may provide better results, as the 3-D extent allows the user 110 to easily point the handheld controller 120 at the control location from any angle.

Figure 9:
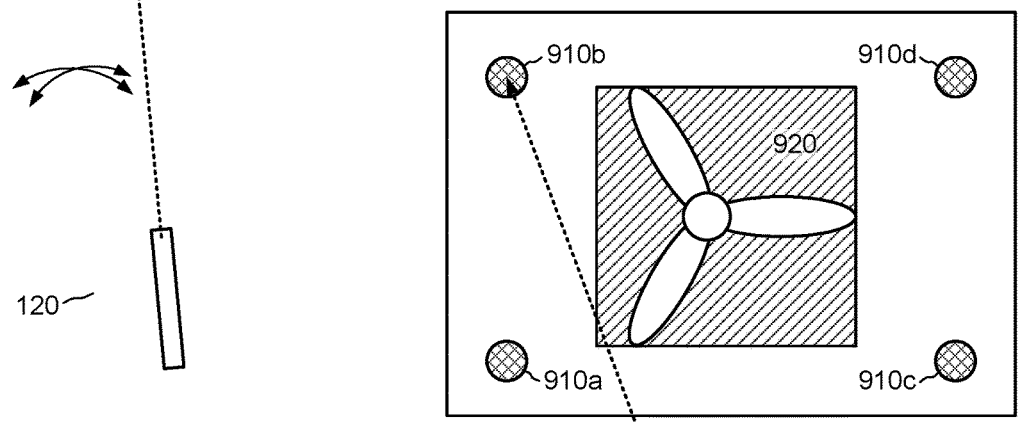
FIG. 9 shows an upward-facing view of an arrangement for training a handheld controller to recognize a control location as multiple distinct regions.

FIG. 9 shows an example of associated point training. The depicted view is that of ceiling (looking up). The ceiling may have recessed lights 910a-910d and a ceiling fan 920. It is assumed in this example that the lights 910a-910d and the ceiling fan 920 have respective electronic controllers (not shown), which are vault network elements or devices.

But for the presence of the ceiling fan 920, it might make sense to use extent training for establishing a control location of the lights 910a-910d, as a single rectangle could encompass all four lights. The user 110 could simply point the handheld controller 120 straight up and press the click-to-capture button, without needing to take especially careful aim. However, using extent training on the lights 910a-910d would give rise to ambiguity as to whether the handheld controller 120 was pointing to the lights 910a-910d or to the ceiling fan 920.

To avoid ambiguity in selecting objects, the user 110 may employ associated point training for the lights 910a-910d. Such training would train on each of the lights individually, but would define the lights as part of a group. Training to locations of individual lights may proceed using any of the above approaches (multiple vantage points, touch, or extent—on individual lights). The object database 164 would then associate the lights 910a-910d with all of the trained locations, such that pointing the handheld controller 120 at any of the trained locations would enable the user to control all of the lights 910a-910d together.

Although detection of controllable objects has been described herein based on exact intersections of the virtual ray 130 with control locations of objects, one should appreciate that embodiments hereof may also include approximate intersections. For example, the handheld controller 120 may display an object (as in FIG. 5B) even if the virtual ray 130 does not exactly intersect the control location of the object. The system may thus allow for pointing errors, particularly in cases where there is little or no ambiguity between objects. The system may also learn user habits over time and avoid presenting users with multiple choices of objects to control when habits indicate that the user normally makes a particular choice.

Figure 10:
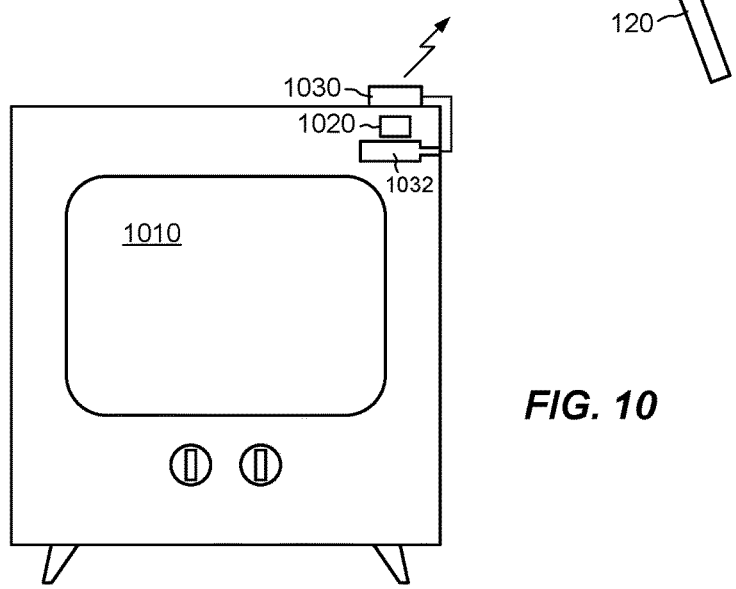
FIG. 10 shows a front view of a legacy electronic device adapted for use with the handheld controller of FIGS. 3 and 4.

FIG. 10 shows an example arrangement for using the handheld controller 120 to control objects that are not inherently vault devices or elements. For example, object 1010 is an old television that provides no native vault network support. The television 1010 does have an IR (infrared) detector 1020, however, for receiving remote-control commands from a conventional IR remote.

Here, an adapter 1030 is provided as a vault-network-compliant device or element. The adapter 1030 communicates with the vault network, e.g., using a wireless interface, and includes an IR source 1032, which may be attached to the television 1010 in front of the IR detector 1020. The object database 162 stores information about the adapter 1030, which may include instructions for controlling the television 1010. The user 110 defines a control location for the adapter 1030, e.g., as a cube that encompasses the body of the television 1010. The user 110 is then able to point to and control the television 1010 using the handheld controller 120 just as it would any vault-network-compliant object. The adapter 1030 receives commands from the handheld controller 120, which commands the IR source 1032 converts to IR signals that the IR detector 1020 in the television 1010 can receive, causing the television 1010 to change its settings as it would when responding to its native IR remote control.

The handheld controller 120 provides a platform that programmers may leverage in a variety of original and useful ways. For example, the narrow field camera 330 enables accurate mapping and characterization of physical spaces. The user 110 can walk through the physical space 112, pointing the camera 330 at walls, ceilings, floors, furniture, and the like. By combining images from the camera with orientation and location information, the server apparatus 160 can generate accurate maps of the physical space 112.

As the handheld controller 120 has the ability to control any controllable object in the physical space, software applications may be developed to control activities between and among different controllable objects. For example, the user 110 may point the handheld controller 120 at one object, such as a first computer, and drag the pointer to another object, such as a second computer. The handheld controller 120 may display a context-sensitive menu, which enables the user 110 to select an appropriate action, such as transferring certain files from the first computer to the second computer, establishing a network connection between the computers, and so forth. As another example, the user 110 may point the handheld controller 120 at one computer and drag to an electronic picture frame, such that pictures stored on the computer are displayed on the electronic picture frame. Indeed, there are nearly limitless possibilities for controlling actions between and among controllable objects using the handheld controller 120.

Figure 11:
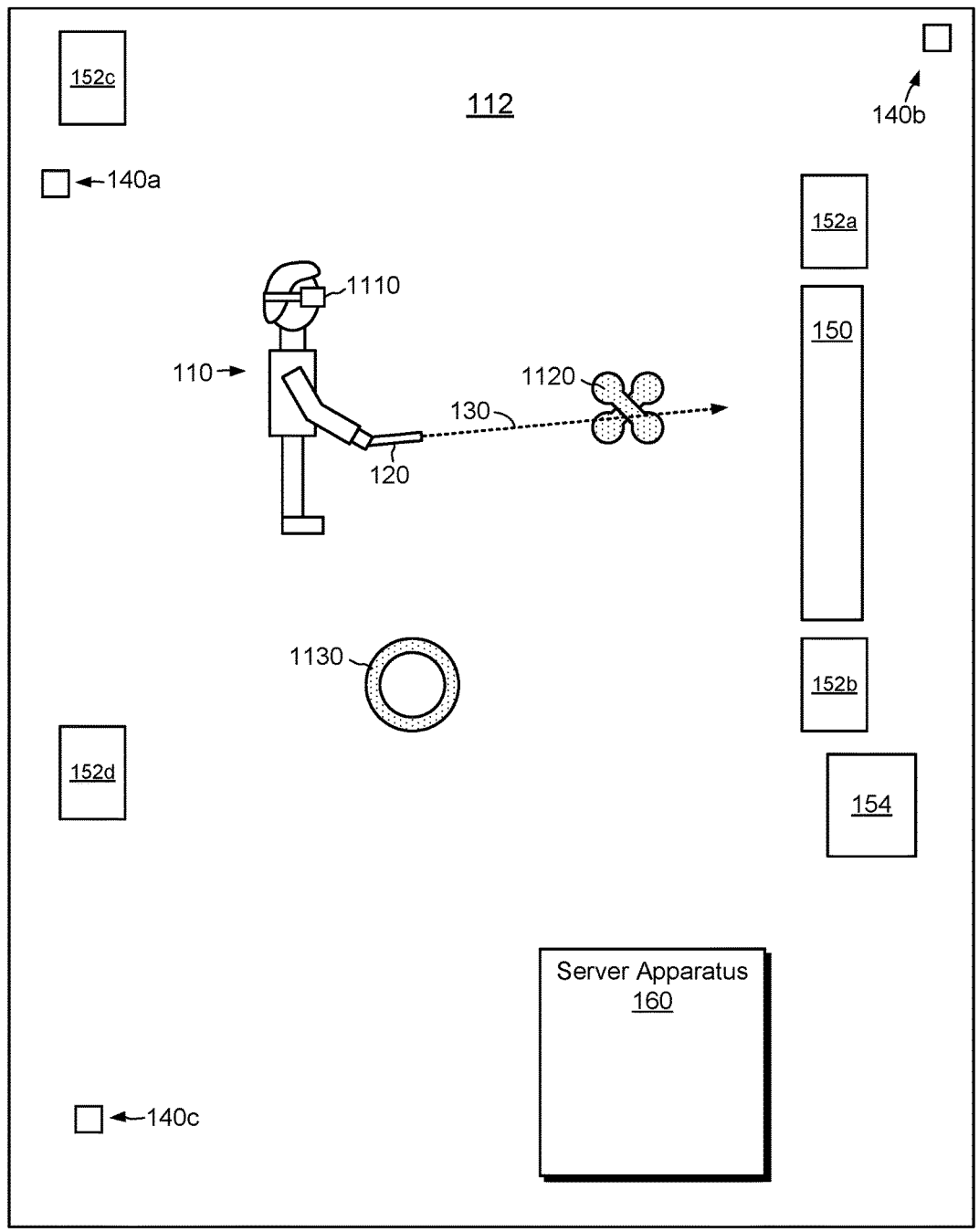
FIG. 11 is a top, plan view of the environment of FIG. 1, where a user wears a 3-D headset and uses a handheld controller to control holograms.

FIG. 11 shows yet another application of the handheld controller 120, this time for controlling virtual objects. In this example, the user wears a 3-D headset 1110, such as an augmented reality (AR) headset or mixed reality (MR) headset. An example of an AR headset is Google Glass, and an example of an MR headset is the Microsoft HoloLens. The 3-D headset 1110 is capable of generating 3-D images. For example, the 3-D headset 1110 includes a pair of transparent or translucent display elements positioned in front of the user's eyes (one display element per eye). The 3-D headset 1110 further includes one or more cameras that scan the local environment to identify features in the user's surroundings. A computer within the 3-D headset generates virtual images for left and right eyes which, when viewed by the user 110, appear as 3-D objects in the physical space. These virtual objects are referred to herein as "holograms," and two holograms 1120 and 1130 are shown. The holograms 1120 and 1130 may appear to the user 110 to have fixed locations in the physical space 112 and to maintain proper perspective and size when the user moves, appearing as if they were part of the natural environment. In an example, the 3-D headset 1110 is paired with the handheld controller 120, such that the two can communicate without interference from other 3-D headsets or other handheld controllers that may be operating in the vicinity.

In an example, the holograms 1120 and 1130 are controllable objects entered in the object database 164 and having respective control locations. In the case of virtual objects, control locations may be assigned by software (e.g., by a game or other application), rather than being trained by the user 110. Also, control locations of virtual objects may change over time, e.g., as the virtual objects may be allowed to move within the space 112.

The user 110 may select a virtual object in much the same way that the user selects a physical object, i.e., by pointing the handheld controller 120 at the apparent location of the virtual object. When the virtual ray 130 intersects the control location of the virtual object, an identifier of the virtual object appears on the touchscreen 310. Alternatively, elements normally displayed on the touchscreen 310 are instead displayed by the 3-D headset 1110 (or they are displayed in both locations). The user 110 can then interact with virtual object using controls on the handheld controller 120 and/or controls visible through the 3-D headset 1110.

One can appreciate that using the handheld controller 120 to control virtual objects opens many new avenues for creative applications. One such application is shown in FIG. 12.

Figure 12:
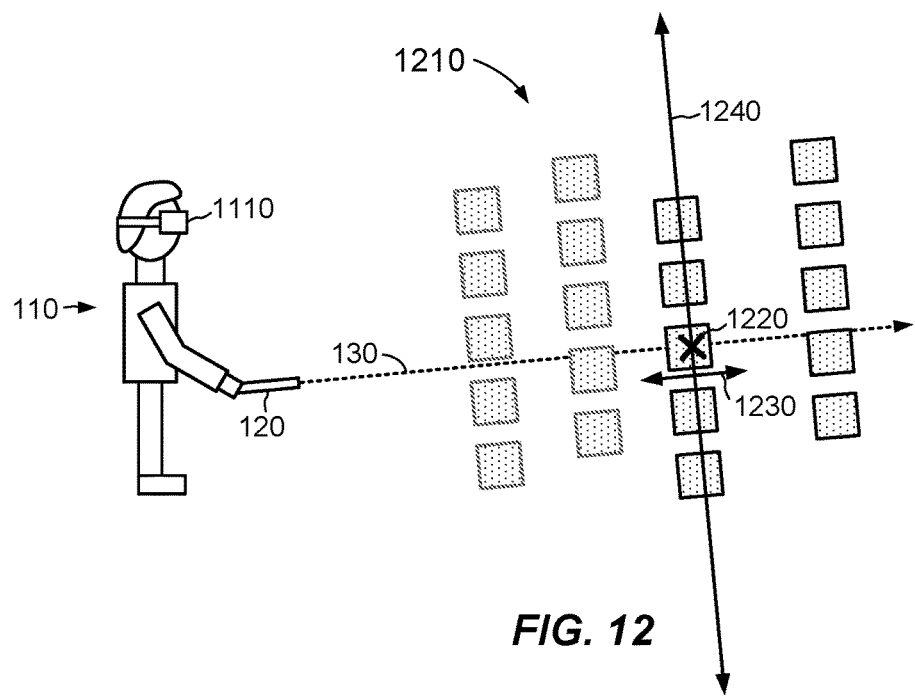
FIG. 12 shows a portion of the environment of FIG. 1, in which a user selects and manipulates holograms using a handheld controller.

FIG. 12 shows an example use of the handheld controller 120 as a pointer device for virtual objects. The handheld controller 120 as used in this context may be regarded as a type of holographic pointer or "holographic mouse."

In the example shown, the user 110 operates the handheld controller 120 as a holographic mouse to interact with holograms 1210. The holograms 1210 may be conventional holograms or holographic icons, which the user may activate to perform defined operations. The 3-D headset 1110 projects the holograms 1210 to appear at respective locations in the environment 112. In an example, the 3-D headset 1110 projects the virtual ray 130 as a visible feature to the user 110, and projects a holographic cursor 1220 (shown as a "X") somewhere along the length of the virtual ray 130.

In an example, the handheld controller 120 provides user access to particular controls when the handheld controller 120 is used as a holographic mouse. These controls may be implemented using soft controls (via the touchscreen 310 or through the 3-D headset 1110), by using physical buttons or controls, such as those shown in FIG. 3, or using some combination thereof. Examples of holographic controls may include the following:

D-Pad: A direction pad. Used in either one-dimensional or two-dimensional modes, depending on use case. In one-dimensional mode, the D-pad may define a distance along the virtual ray 130 to the holographic cursor 1220. For example, operating the D-pad in this mode moves the holographic cursor 1220 along direction 1230, i.e., back and forth along the virtual ray 130. In two-dimensional mode, the D-pad may be used in connection with the click-to-capture feature 520 (FIG. 5), to move the holographic cursor 1220 around a two dimensional plane.

Select Button: The select button is used to select and deselect objects.

Slicing Plane Button: Used to define a slicing plane. A slicing plane is orthogonal to the virtual ray 130. Arrows 1240 show an example slicing plane. In an example, the 3-D headset 1110 is configured to hide virtual content between the user 110 and the slicing plane 1240 from user view. Holograms that intersect the slicing plane 1240 are made visible and are currently selectable. Holograms behind the slicing plane are typically visible as well, but are typically not selectable.

Rotate Button: The user 110 may rotate a single hologram so that the hologram fits into physical space as the user desires or so that the user is able to see a particular portion of the hologram. The user 110 may wish to rotate a collection of holograms so that the user has a better view into the collection.

Metadata Button: The metadata button is a 3-D analog to the right button of a typical Windows OS (operating system) mouse. Similar effects could be achieved by having a metadata control point on the hologram.

The following are examples of common uses of the handheld controller 120 when employed as a holographic mouse:

Select Object: The holographic cursor 1220 is placed on a first object, real or virtual, along the virtual ray 130. When the cursor 1220 passes over a holographic icon, the icon is brought into focus. If the user presses the select button while the icon is in focus, the focus becomes sticky. This means that the icon will remain in focus after the cursor 1220 has moved away from the object.

Select collection of Objects: A collection of objects is selected by creating a bounding box.

Add or Delete objects to/from collection: Here, an arbitrary collection of objects is in sticky focus. The user 110 may then wish to add or delete sticky focus to another object or objects. In Windows OS, one presses and holds the control key while making the selection to enable adding deleting an icon or icons to the collection. If a keyboard is available this method continues to function. Since the user 110 may not have a keyboard available, however, another option is required. The metadata button brings up a drop down list of functional options and metadata. One of these options is labeled "control." When the metadata button is pushed again, what was the control option is now labeled "release control." This provides the familiar experience of adding and deleting icons without adding an extra button or another physical interface.

Move selection: The user 110 generally wishes to move icons in 3-D space for two different reasons. The first is to relocate an icon. The second is to move a group of icons so that one can be chosen for user operation. In Windows OS, this second concept is not necessary because the icons all lie on a 2D plane equally visible to the user. In 3D space, the icons may need to be moved just so the user can differentiate them. In an example, moving a selection is performed by pressing the D-Pad. The D-Pad is single-dimensional unless the slice button has been pushed. The selection (i.e. icons in sticky focus) will jump to the virtual ray 130 at a distance equal to the distance at the time of selection.

Then, by moving the handheld controller 120, the selection will follow the virtual ray 130 in 3D space. Using the D-Pad will move the selection closer or farther along the path of the virtual ray 130. Pressing select again will stop the moving process and the objects in the selection will remain in sticky focus.

Rotate selection: The user rotates a selection by first pressing and holding the rotate button. While the rotate button is down, the rotation of the handheld controller 120 in 3D space controls the rotation of the selection. The handheld controller 120 does not need to be pointed at the selection at the time of pressing the rotate button. Since the wrist is not free to rotate 360 degrees in all directions, the user might have to press rotate-release a few times to achieve the desired orientation of the selection. The ratio of number of degrees of mouse rotation to selection rotation is flexible depending on the requirements of the user or application.

Place selection: Because there are two reasons to move a hologram, placing a hologram in the new location cannot generally be automatic. If the user 110 removes sticky focus from a selection without placing the selection, the selection pops back to its original location. The user places the selection by using the metadata button and choosing the place selection in the drop down menu.

Slicing Plane: A slicing plane is a method to search through objects in 3D space. The user presses the slicing plane button. The user points the handheld controller 120 to choose a direction for the virtual ray 130. A slicing plane 1240 is created orthogonally to the virtual ray 130 at the point of the cursor 1220. The user also uses the D-Pad to determine the distance of the slicing plane 1240 from the user along the virtual ray 130. When the user is satisfied with the placement of the slicing plane 1240, the user presses the slicing plane button to lock the plane. If no selection is made, the slicing plane 1240 interacts with all icons (holograms). If a selection is made, the slicing plane 1240 interacts with only the objects in the selection. The behavior of the slicing plane 1240 is as follows: Icons between the slicing plane 1240 and the user are not displayed; Icons intersecting the slicing plane 1240 are shown with bright or enhanced focus; Icons behind the slicing plane have diminished focus; After the slicing plane is locked, the user may point the handheld controller 120 to a selection on the slicing plane or use the D-Pad in two-dimensional mode to control the cursor over the extent of the plane.

Activate: This is synonymous with opening a file or launching an application in Windows OS. Would be double click of select button for consistency with standard mouse.

Change View: The user may change the view of selection from the 3D representation of the group of icons into other formats. This is achieved by pressing the metadata button. The mouse does not need to point at the selection for the action to occur. The user selects a different view from the list of options. When selected, the appropriate view is shown. Examples include a labeled list, much like a standard window of file names, and a grid of holograms on a plane.

Applications of the handheld controller 120 to virtual content create opportunities to use the handheld controller 120 with games. For example, the handheld controller 120 may be provided as a gaming controller in a mixed reality game. When used with an AR or MR headset, users are able to see the handheld controller 120 through the headset, as the headset is transparent.

Figure 13:
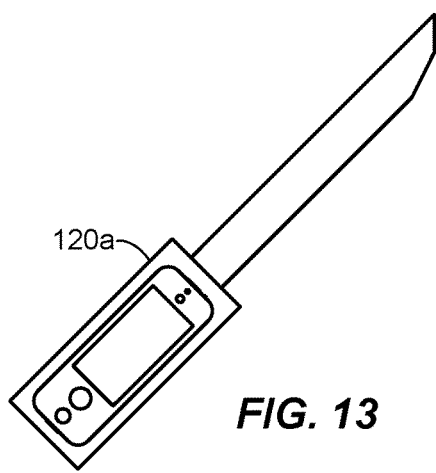
FIG. 13 is a side view of an example handheld controller, fashioned to appear as a knife.
Figure 14:
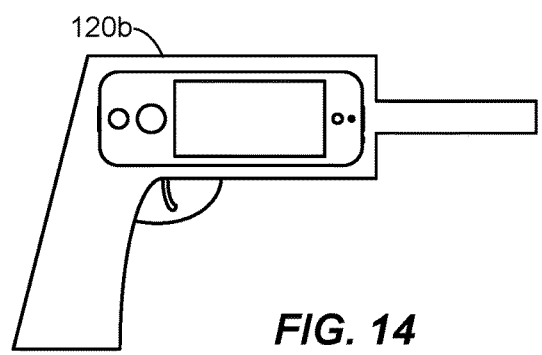
FIG. 14 is a side view of an example handheld controller, fashioned to appear as a gun.

To promote a more realistic gaming experience, the handheld controller 120 may be embodied in the form of a simulated knife (FIG. 13) or a simulated gun (FIG. 14). In this manner, the handheld controller 120a, when used during gameplay as a knife, will appear to the user as a knife. Likewise, the handheld controller 120b, when used during gameplay as a gun, will appear to the user as a gun. One should appreciate that many different physical embodiments of handheld controllers may be produced, and that such embodiments may include buttons and other controls tailored to the particular use cases.

Figure 15:
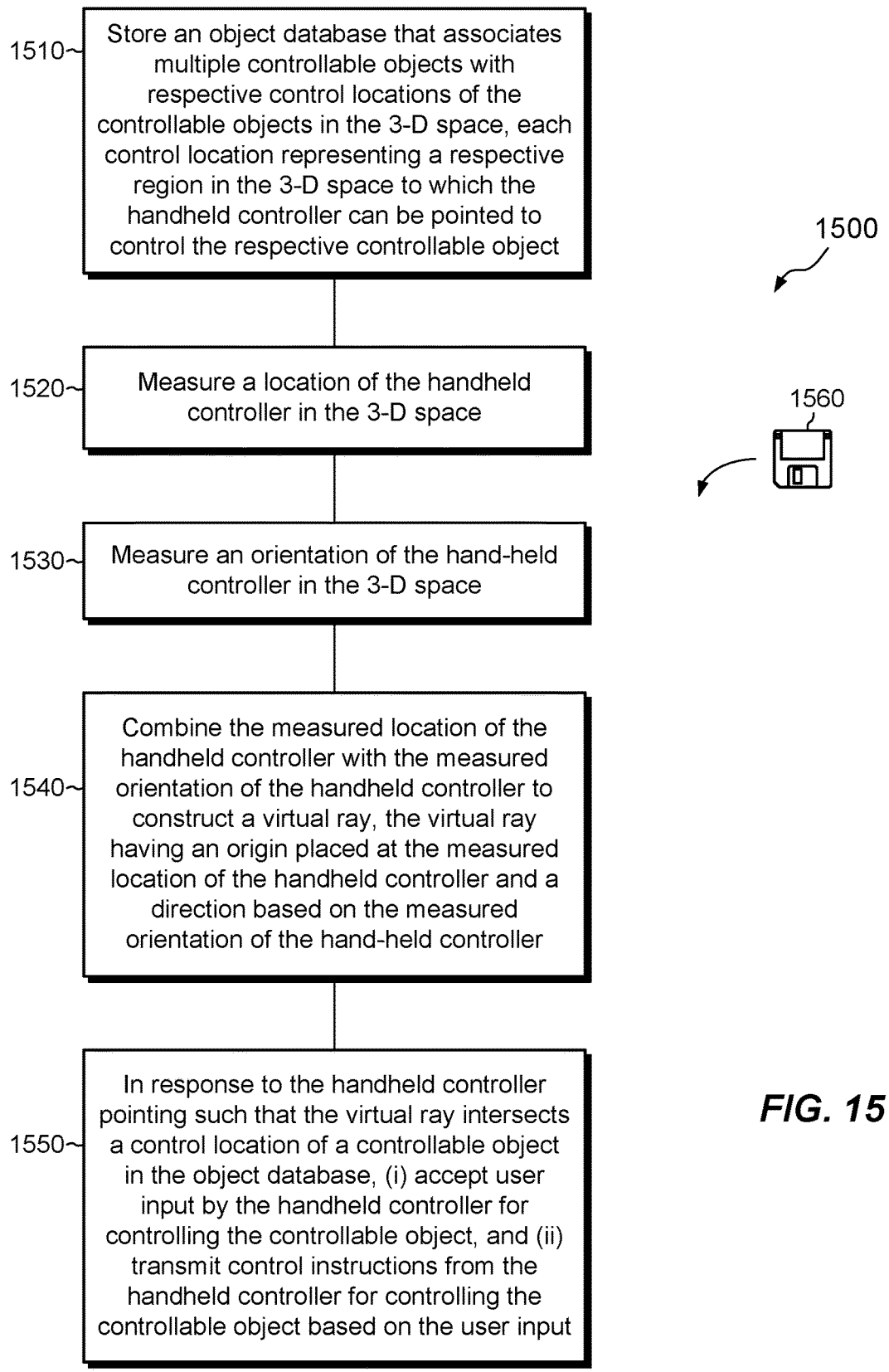
FIG. 15 is a flowchart showing an example method of controlling objects in 3-D space.

FIG. 15 shows an example method 1500 that may be carried out in connection with the environment 100. The method 1500 is typically performed, for example, by software constructs embodied in the handheld controller 120 and in the server apparatus 160. The various acts of method 1500 may be ordered in any suitable way. Accordingly, embodiments may be constructed in which acts are performed in orders different from that illustrated, which may include performing some acts simultaneously.

At 1510, an object database 164 is stored that associates multiple controllable objects (e.g., objects 150, 152, 154) with respective control locations of the controllable objects in 3-D space 112. Each control location represents a respective region in the 3-D space 112 to which the handheld controller 120 can be pointed to control the respective controllable object.

At 1520, a location is measured of the handheld controller 120 in the 3-D space 112. For example, the handheld controller 120 emits Wi-Fi packets that travel through space 112 to sensors 140, which detect the packets and generate outputs, which are forwarded to the control circuitry 160. The control circuitry 160 processes the outputs to generate a measurement of location of the handheld controller 120.

At 1530, an orientation is measured of the hand-held controller 120 in the 3-D space 112. For example, the handheld controller 120 includes measurement circuitry 430, which measures the orientation of the handheld controller 120.

At 1540, the measured location of the handheld controller 120 is combined with the measured orientation of the handheld controller 120 to construct a virtual ray 130, the virtual ray having an origin placed at the measured location of the handheld controller 120 and a direction based on the measured orientation of the hand-held controller 120.

At 1550, in response to the handheld controller 120 pointing such that the virtual ray 130 intersects a control location of a controllable object in the object database 164, (i) user input is accepted by the handheld controller 120 for controlling the controllable object, and (ii) control instructions are transmitted from the handheld controller 120 for controlling the controllable object based on the user input.

An improved technique has been described for controlling objects. The technique includes a handheld controller 120 that provides output for generating a virtual ray 130. The virtual ray 130 has a location and a direction. The location of the virtual ray 130 is measured as a location of the handheld controller 130, based on input from sensors 140 in the surrounding space 112. As a user 110 moves and/or rotates the handheld controller 120, the virtual ray 130 sweeps through space, intersecting various objects. When the virtual ray 130 intersects with the location of a controllable object whose identity and location are known, the handheld controller 130 identifies the object and accepts remote-control input from the user 110 for controlling that object. Using the handheld controller 120, the user may control any controllable object having a known identity and location in space, and may control virtual as well as physical objects.

Having described certain embodiments, numerous alternative embodiments or variations can be made. For example, the handheld controller 120 has been described as a vault network element. This is merely an example, however, as the handheld controller 120 may be used in contexts that do not involve a vault network.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 1560 in FIG. 15). Any number of computer-readable media may be used. The media may be encoded with instructions which, when executed on one or more computers or other processors of the handheld controller 120 and/or server apparatus 160, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of controlling objects in a 3-D (three-dimensional) space using a handheld controller, the method comprising:
    storing an object database that associates multiple controllable objects with respective control locations of the controllable objects in the 3-D space, each control location representing a respective region in the 3-D space to which the handheld controller can be pointed to control the respective controllable object;
    measuring an orientation of the hand-held controller in the 3-D space;
    measuring, substantially simultaneously with measuring the orientation, a location of the handheld controller in the 3-D space by a base station coupled to multiple antennas;
    combining the measured location of the handheld controller with the measured orientation of the handheld controller to construct a virtual ray, the virtual ray having an origin placed at the measured location of the handheld controller and a direction based on the measured orientation of the hand-held controller; and
    in response to the handheld controller pointing such that the virtual ray intersects a control location of a controllable object in the object database, (i) accepting user input by the handheld controller for controlling the controllable object, and (ii) transmitting control instructions from the handheld controller for controlling the controllable object based on the user input,
    wherein the orientation of the handheld controller is measured by measurement circuitry within the handheld controller, and wherein the location of the handheld controller is measured based on receipt, by the base station via the antennas, of a wireless packet from the handheld controller, the wireless packet including the measured orientation of the handheld controller, the wireless packet thus providing both the orientation of the handheld controller at a particular time and a basis for measuring the location of the handheld controller at the same particular time.

2. The method of claim 1, wherein measuring the location of the handheld controller includes:
    transmitting, the wireless packet by the handheld controller, the wireless packet propagating through space and encountering multiple antennas, the antennas each processing the wireless packet to produce respective outputs; and
    processing the outputs from the multiple antennas to generate the location of the handheld controller in the 3-D space.

3. The method of claim 1, further comprising:
    while the virtual ray intersects the control location of the controllable object, receiving, by the handheld controller, a capture command from the user, the capture command directing the handheld controller to capture an identity of the controllable object and enabling subsequent control of the controllable object using the handheld controller, regardless of where the handheld controller points after the capture command is received,
    the handheld controller thereafter receiving user input for controlling the controllable object and transmitting control instructions to control the controllable object when the virtual ray no longer intersects the control location of the controllable object.

4. The method of claim 3, further comprising, in response to the virtual ray intersecting control locations of a plurality of the controllable objects identified in the object database:
    displaying, by the handheld controller, a list of indicators defined for the plurality of controllable objects; and
    while the virtual ray intersects the control locations of the plurality of controllable objects, receiving, by the handheld controller, another capture command, the other capture command directing the handheld controller to capture the list of indicators of the plurality of controllable objects and enabling subsequent control of any of the plurality of controllable objects, regardless of where the handheld controller points after the other capture command is received, the handheld controller thereafter receiving user input for selecting one of the plurality of controllable objects and for controlling the selected controllable object when the virtual ray no longer intersects the control location of the selected controllable object.

5. The method of claim 3, further comprising:

(A) storing a history of controllable objects previously controlled by the handheld controller;

(B) receiving, by the handheld controller, user input to control a controllable object selected from the history; and (C) transmitting control instructions from the handheld controller for controlling the selected controllable object, wherein the acts (B) and (C) are performed without the virtual ray intersecting the control location of the selected controllable object.

6. The method of claim 3, further comprising establishing a control location for a particular controllable object at a user-defined region in the 3-D space, the control location for the particular controllable object providing a location to which the handheld controller is pointed to control the particular controllable object.

7. The method of claim 6, wherein the particular controllable object is electrically connected to an electronic controller, the electronic controller occupying a location in the 3-D space, and wherein the control location for the particular controllable object does not intersect with the location of the electronic controller.

8. The method of claim 6, wherein establishing the control location of the particular controllable object includes the handheld controller executing a training procedure to associate the control location of the particular controllable object in the 3-D space with the particular controllable object.

9. The method of claim 8, wherein executing the training procedure includes:

receiving, by the handheld controller, a user selection of the particular controllable object for training;

acquiring, by the handheld controller, values of the virtual ray when the handheld controller is pointed to the control location of the particular controllable object from multiple different locations in the 3-D space; and computing the control location of the particular controllable object as a region of intersection in the 3-D space of the acquired values of the virtual ray.

10. The method of claim 8, wherein executing the training procedure includes:

receiving, by the handheld controller, a user selection of the particular controllable object for training; and with the handheld controller physically located at the control location for the particular controllable object, receiving, by the handheld controller, user input that directs the handheld controller to assign its current location in the 3-D space as the control location of the particular controllable object.

11. The method of claim 8, wherein the control location of the particular controllable object extends across a particular region in space, and wherein executing the training procedure includes:

acquiring, by the handheld controller, locations in the 3-D space of multiple vertices of the particular region in space; and computing a 3-D region of the control location as a smallest convex shape that contains the multiple vertices.

12. The method of claim 8, wherein the control location of the particular controllable object includes multiple distinct regions at respective locations in the 3-D space, and wherein executing the training procedure includes:

acquiring, by the handheld controller, locations in the 3-D space of each of the multiple distinct regions; and aggregating the acquired 3-D locations of the distinct regions as the control location of the particular controllable object, such that the control location of the controllable object corresponds to any of the multiple distinct regions in 3-D space.

13. The method of claim 3, wherein the object database stores a control location in the 3-D space of a virtual controllable object, and wherein the method further comprises:

establishing electronic communication between the handheld controller and a 3-D headset configured to render the virtual controllable object as a hologram; and in response to the handheld controller pointing such that the virtual ray intersects the control location of the virtual controllable object, accepting user input by the handheld controller for controlling the virtual controllable object.

14. The method of claim 13, further comprising:

transmitting values of the virtual ray to the 3-D headset to enable the 3-D headset to render a holographic cursor projected to appear along the virtual ray.

15. The method of claim 14, further comprising:

receiving, by the handheld controller, user input to adjust a depth of the holographic cursor as rendered by the 3-D headset along the virtual ray.

16. The method of claim 14, further comprising:

receiving, by the handheld controller, user input to select a hologram pointed to by the holographic cursor.

17. The method of claim 16, further comprising:

receiving, by the handheld controller, user input to rotate the selected hologram.

18. The method of claim 16, further comprising:

receiving, by the handheld controller, user input to move the selected hologram.

19. The method of claim 16, further comprising:

receiving, by the handheld controller, user input to display a list of options for interacting with the selected hologram.

20. The method of claim 16, further comprising:

receiving, by the handheld controller, user input to generate a slicing plane orthogonal to the virtual ray, the slicing plane enabling the handheld controller to select holograms based on their locations relative to the slicing plane.

21. The method of claim 1, wherein measuring the location of the handheld controller is performed by a server apparatus separate from the handheld controller.

22. The method of claim 1, further comprising transmitting, by the handheld controller, a locator packet, the locator packet being a wireless packet that includes a substantially empty payload and serves as a basis for triggering a new location measurement of the handheld controller.

23. The method of claim 22, further comprising generating the new location measurement of the handheld controller based on receipt of the locator packet by multiple antennas.

24. The method of claim 1, wherein the wireless packet is a Wi-Fi (IEEE 802.11x) packet and the antennas are Wi-Fi antennas.

25. A handheld controller for controlling objects, the handheld controller comprising:
- a user interface;
- a wireless communication interface;
- measurement circuitry configured to measure an orientation of the handheld controller in 3-D (three-dimensional) space;
- a set of processors; and
- memory,
- the set of processors and the memory together forming control circuitry constructed and arranged to:
  - direct the measurement circuitry to produce a set of measurements of orientation of the handheld controller;
  - for each of the set of measurements of orientation, direct the wireless interface to transmit a respective wireless packet that carries the respective measurement of orientation of the handheld controller to multiple sensors (i) to enable a base station coupled to the sensors to measure, substantially simultaneously with the respective measurement of orientation, a location of the handheld controller based on the wireless packet as received by the multiple sensors and (ii) to generate a virtual ray having an origin at the measured location of the handheld controller and a direction based on the measured orientation of the handheld controller;
- for at least one of the measurements of orientation, (i) identify a controllable object intersected by the respective virtual ray and (ii) direct the wireless interface to transmit control instructions for controlling the identified controllable object.

26. The handheld controller of claim 25, further comprising a set of accelerometers, wherein the control circuitry is further constructed and arranged to:
- vary a rate at which the wireless interface is directed to transmit wireless packets based on output from the set of accelerometers, the rate increasing for higher levels of acceleration and decreasing for lower levels of acceleration.

27. The handheld controller of claim 26, wherein the handheld controller has an outward appearance that resembles one of (i) a gun and (ii) a sword.

28. A method of controlling objects in a 3-D (three-dimensional) space using a handheld controller, the method comprising:
- measuring, by measurement circuitry within the handheld controller, an orientation of the handheld controller in the 3-D space;
- measuring, substantially simultaneously with measuring the orientation, a location of the handheld controller in the 3-D space based on a wireless packet signal emitted by the handheld controller; and
- combining the measured location of the handheld controller with the measured orientation of the handheld controller to construct a virtual ray, the virtual ray having an origin placed at the measured location of the handheld controller and a direction based on the measured orientation of the handheld controller,
- wherein the measured orientation of the handheld controller is provided within the wireless packet emitted by the handheld controller such that the wireless packet indicates both the location and orientation of the handheld controller at a same particular time.

* * * * *